United States Patent
Veldhuis et al.

(10) Patent No.: US 8,369,580 B2
(45) Date of Patent: Feb. 5, 2013

(54) METHOD FOR TRANSFORMING A FEATURE VECTOR

(75) Inventors: Raymond Veldhuis, Eindhoven (NL); Chun Chen, Eindhoven (NL); Antonius Akkermans, Eindhoven (NL); Thomas Kevenaar, Eindhoven (NL)

(73) Assignee: Priv ID B.V., Eindhoven (NL)

( * ) Notice: Subject to any disclaimer, the term of this patent is extended or adjusted under 35 U.S.C. 154(b) by 407 days.

(21) Appl. No.: 12/677,434

(22) PCT Filed: Sep. 3, 2008

(86) PCT No.: PCT/IB2008/053553
§ 371 (c)(1),
(2), (4) Date: Jun. 23, 2010

(87) PCT Pub. No.: WO2009/034498
PCT Pub. Date: Mar. 19, 2009

(65) Prior Publication Data
US 2010/0272325 A1    Oct. 28, 2010

(30) Foreign Application Priority Data
Sep. 11, 2007 (EP) .................... 07116071

(51) Int. Cl.
*G06K 9/00* (2006.01)
(52) U.S. Cl. ..................................... 382/115
(58) Field of Classification Search .............. 382/115, 382/117, 124, 222, 232
See application file for complete search history.

(56) References Cited

U.S. PATENT DOCUMENTS
5,291,560 A    3/1994 Daugman

2007/0160266 A1    7/2007 Jones et al.

OTHER PUBLICATIONS

Sun, Zhenan, et al., "Iris Recognition Based on Non-Local Comparisons"; Lecture Notes in Computer Science, Springer, Verlag, Berlin, Germany, vol. 3338, Dec. 13, 2004, pp. 67-77.
Thornton, Jason, et al., "An Evaluation of Iris Representations"; Biometrics: Theory, Applications, and Systems, 2007, BTAS 2007, First IEEE International Conference, Sep. 1, 2007, pp. 1-6.

*Primary Examiner* — Duy M Dang
(74) *Attorney, Agent, or Firm* — Smith Gambrell & Russell LLP

(57) ABSTRACT

The present invention relates to a method for transforming a feature vector comprising a first and a second feature represented by a first and a second feature value, respectively, into a feature code using an encoder, said feature code usable in an algorithm and having a predetermined number of bits, said method comprising the steps of determining for each of the first and the second features the performance as a function of the length of the feature code, and using the dependency between the performance and the feature code length for each of the individual features derived in the step of determining to find feature code lengths for the first and the second features in such a way that the sum of the bit length of the first and the second feature codes has a length equaling said predetermined bit length. An advantage with the present invention is that it solves the problem in the case of template protection systems which only accept binary templates and where the resulting classification quality of the biometric system to a very large extend depends on the quality of the binary strings. Another advantage with the present invention is that it also solves the problem of matching time in an identification setting because binary strings can easily be compared. The present invention also relates to a similar arrangement for transforming a feature vector into a feature code.

12 Claims, 7 Drawing Sheets

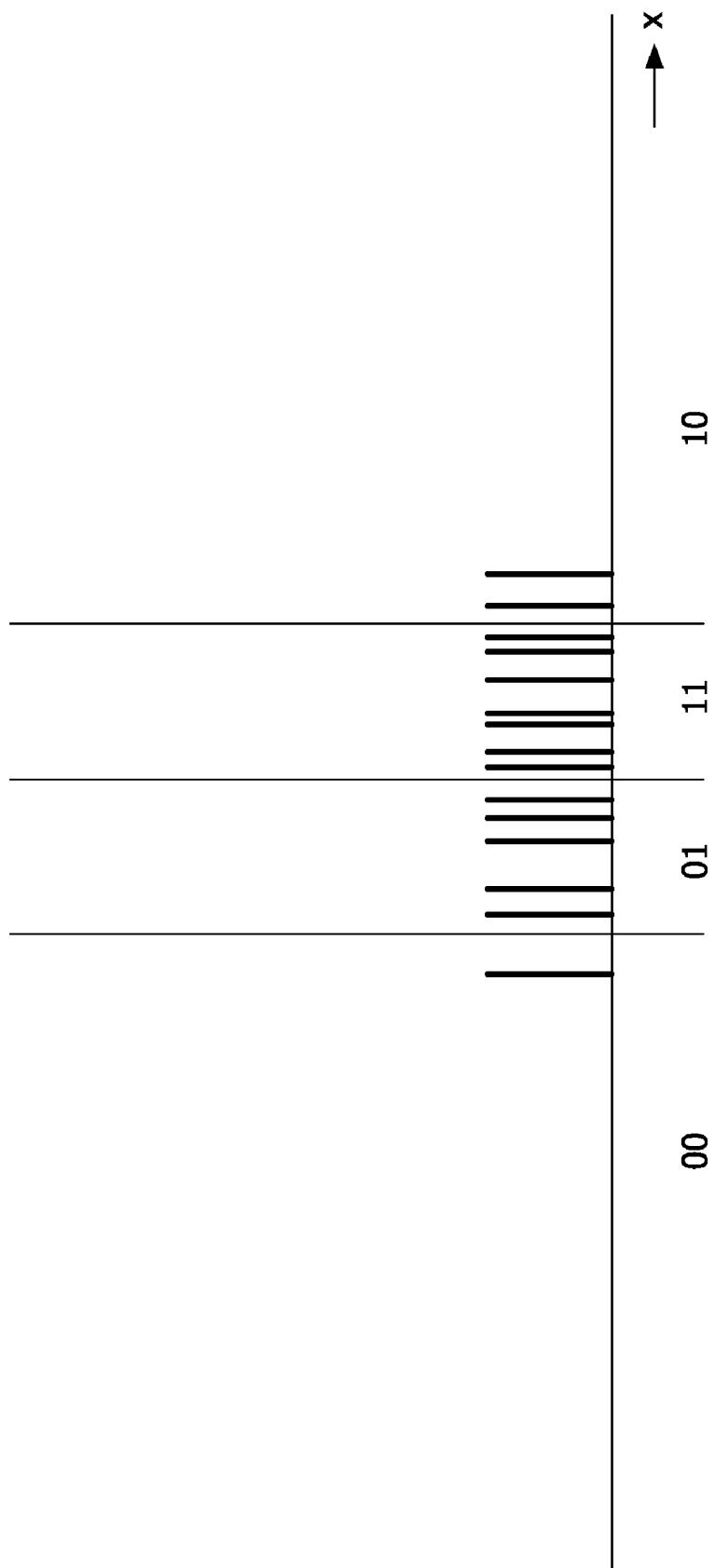

METHOD FOR TRANSFORMING A FEATURE VECTOR

CROSS-REFERENCE TO RELATED APPLICATIONS

This application is the U.S. National Phase under 35 U.S.C. 371 of International Application No. PCT/IB2008/053553 filed Sep. 3, 2008, which claims priority from European Patent Application No. 07116071.7, filed Sep. 11, 2007, both of which are relied on and incorporated herein by reference.

FIELD OF THE INVENTION

The present invention generally relates to a method for transforming a feature vector into a feature code, and more specifically to an improved method for transforming a biometric real-valued feature vector into a feature code. The present invention also relates to a corresponding arrangement for transforming a biometric real-valued feature vector into a feature code.

DESCRIPTION OF THE RELATED ART

The field of biometrics is concerned with recognizing individuals by means of unique physiological or behavioral characteristics, such as face, voice, iris and fingerprint. Recently biometric systems have become increasingly popular because they potentially offer more secure solutions than other identification means, such as PIN codes and security badges, because a biometric is tightly linked to an individual. For the same reason, biometrics can prevent the use of several identities by a single individual. Biometrics are also more convenient, because unlike passwords and PIN codes they cannot be forgotten and are always at hand. As such, biometrics are a good candidate for user-friendly access control to services and information, such as in applications like banking and building access control, and also in relation to the connected home environment (e.g. in connection to Digital Rights Management (DRM)).

Biometrics can be used both for authentication and identification. In authentication, an individual claims to have a certain identity, and the authentication system compares an offered biometric template with a biometric template stored somewhere in the system that is linked to the claimed identity. In comparison, in the case of identification, the offered biometric template is compared with all available templates in order to reveal the identity of an individual. The biometric template generally consist of real-valued feature vectors in some high dimensional space that is based on for example features extracted from an image of an individual, where the image is provided by an image sensor.

There are however several problems with prior art biometric systems, especially in relation to storage and handling of biometric information provided by the individual using the biometric system, i.e. relating to privacy concerns. As a biometric feature vector provides a good representation of a biometric of an individual, unprotected storage of biometric information in biometric systems might lead to, for example, identity theft. In the past years, this privacy problem has been emphasized, and biometric template protection methods have been proposed to protect the privacy of stored biometric information. However, these template protection methods only accept binary strings (binary templates) and therefore, real-valued feature vectors must first be transformed into binary strings before they can be used in template protection methods.

Furthermore, the time and effort required for a biometric system to perform biometric matching is generally considerable, as in the traditional approach, matching consists of comparing two real-valued feature vectors in a high dimensional space. This is especially obvious in the case of identification, where a life feature vector has to be compared with all feature vectors in the database (a 1:n comparison), and even more so when the database comprising the feature vectors is considerably large.

US 2007/0160266 A1 discloses a method for transforming a high dimensional real-valued feature vector into a binary string. According to the disclosed method, extracted features of an iris in an image are provided to a bank of difference of sum filters to produce an iris feature vector. The filtered output is binarized to produce an iris feature vector, after which the binarized feature vector is used for iris matching. There is however at least one problem with the disclosed method as the binarization method used bluntly generates only one bit per dimension in the real-valued feature vector, thus resulting in an unreliable biometric system.

OBJECT OF THE INVENTION

There is therefore a need for an improved method and an arrangement for transforming a biometric real-valued feature vector into a feature code, and more specifically that overcome or at least alleviates the binarization problems according to prior art.

SUMMARY OF THE INVENTION

According to an aspect of the invention, the above object is met by a method for transforming a feature vector comprising a first and a second feature represented by a first and a second feature value, respectively, into a feature code using an encoder, said feature code usable in an algorithm and having a predetermined number of bits, said method comprising the steps of determining for each of the first and the second features the performance as a function of the length of the feature code, and using this dependency between the performance and the feature code length for each of the individual features derived in the step of determining to find feature code lengths for the first and the second features in such a way that the sum of the bit length of the first and the second feature codes has a length equaling said predetermined bit length.

A feature vector is generally a D-dimensional vector used in for example pattern recognition and machine learning for providing a numerical representation of an object. Many algorithms in machine learning require a numerical representation of objects, since such representations facilitate processing and statistical analysis. When representing images, the feature values might correspond to the pixel values of an image, and when representing texts perhaps to term occurrence frequencies. According to the present invention, each feature vector comprises a first and a second feature represented by a first and a second feature value, respectively. However, the skilled addressee understands that this is only exemplary, and that it is possible to include an arbitrary number of features in each feature vector, each represented by an individual feature value.

The determination of the performance for each of the first and the second features as a function of the length of the feature code is based on the understanding that different feature code lengths gives different resulting performance when executing the method according to the present invention using an algorithm. Furthermore, having a predetermined number of available bits for the resulting feature code, it is thus necessary to select the most "optimal" bits such that an optimal performance result is achieved when selecting the number of bits used to encode the different features.

As mentioned above, feature matching is a complicated and time consuming process, for example in relation to Euclidian distance calculation of a high dimensional feature vector, and therefore the method according to the present invention is directed to transforming a high dimensional feature vector into a feature code having a predetermined number of bits. Thus, the present invention tries to solve the problem of encoding, or quantizing (binarizing), each of the individual features such that it can be represented using fewer bits. Furthermore, the feature codes representing each of the features are constructed such that they lead to optimal classification results under the constraint that the resulting strings have a certain predetermined length, e.g. the maximum available bits assigned to the resulting feature code (i.e. the bit length budget for that feature code).

An advantage with the present invention is that it solves the problem in the case of template protection systems which only accept binary templates and where the resulting classification quality of the biometric system to a very large extend depends on the quality of the binary strings. Another advantage with the present invention is that it solves the problem of matching time because binary strings can easily be compared. Finally, it turns out that the resulting binary templates are small thus relaxing the required storage capabilities which is especially usable in relation to for example embedded systems, smart card based solutions, and similar.

In a preferred embodiment of the present invention, the individual feature code lengths are obtained by the steps of combining every possible feature code length of the first and the second features to get a number of combined feature code lengths, determining, for every combined feature code length, one or more combined performance measures, determining, for every combined feature code length, the feature code length combination that gives optimal performance, discarding, for every combined feature code length, the feature code length combinations that do not have optimal performance, and choosing the combined feature code length that is equal to the predetermined number of bits. Using this embodiment, one is guaranteed to get a global optimum as all possible permutations are tried. Further discussing relating to the steps of the present embodiment are made in the detailed description of the present invention.

In another preferred embodiment of the present invention, the individual feature code lengths are obtained by the steps of a) encoding said first feature value into a first feature code and said second feature value into a second feature code, each feature code being assigned an initial number of bits, b) determining an algorithm performance parameter for each of said first and said second feature code, c) determining the performance increase for either feature when assigning at least one more bit to the feature code, d) re-encoding that one of said first or said second feature value having the largest increase in performance into an updated first or second feature code, e) comparing the sum of bits assigned to the first and second feature code with the predetermined number of bits of the feature code, and f) repeating steps b-e until the sum of bits used for the first and second feature code equals the predetermined number of bits of the feature code. In contrast to the above embodiment, this preferred embodiment in many cases achieves a global optimum, however not in every case. However, the present embodiment is less time and memory consuming, and this might in many cases provide a more desirable solution. Similarly to the previous embodiment, further discussing relating to the mentioned steps are made in the detailed description of the present invention. It should be noted that the initial number of bits can be selected to be an arbitrary number of bits, such as 0, 1, 2 or more bits. Also, the assignment of additional bits includes the assignment of 1 or more bits, depending fully on the step size used in the specific implementation.

Preferably, the feature vector is a biometric feature vector for an individual usable is an identification or verification system, and the algorithm performance parameter is selected such that the detection rate for the identification or verification system is optimized. In an identification or verification system, the detection rate can be defined as $q=1-FRR$, where FRR stands for the False Rejection Rate of the system. Thus, it is possible to define a quality function $q(b)$ describing the quality of the encoder where b number of bits are used.

According to a further aspect of the invention, there is provided an arrangement for transforming a feature vector comprising a first and a second feature represented by a first and a second feature value, respectively, into a feature code using an encoder, said feature code usable in an algorithm and having a predetermined number of bits, said arrangement comprising means for determining for each of the first and the second features the performance as a function of the length of the feature code, and means for using the dependency between the performance and the feature code length for each of the individual features derived using the means of determining to find feature code lengths for the first and the second features in such a way that the sum of the bit length of the first and the second feature codes has a length equaling said predetermined bit length.

As described above in relation to the method according to the present invention, this novel arrangement provides a plurality of advantages over prior art due to the fact it solves the problem in the case of template protection systems which only accept binary templates and where the resulting classification quality of the biometric system to a very large extend depends on the quality of the binary strings.

The arrangement according to the present invention can be comprised in, for example but not limited to, a biometric system, further comprising a biometric acquisition module for providing biometric information representative of an individual, a feature extraction module arranged to generate at least one feature vectors based on the biometric information and a matching module for providing a matching result based on a comparison of the at least one feature code and at least one pre-recorded feature code representative of a plurality of individuals. The biometric system can for example be an identification or a verification system using biometric information based on one of or a combination of face, voice, iris, fingerprint, and/or similar.

BRIEF DESCRIPTION OF THE DRAWINGS

These and other aspects of the present invention will now be described in more detail, with reference to the appended drawings showing currently preferred embodiments of the invention, in which:

FIGS. 3a-3d are diagrams describing the implementation of exemplary encoders according to different embodiments of the present invention.

DETAILED DESCRIPTION OF CURRENTLY PREFERRED EMBODIMENTS

Figure 1:
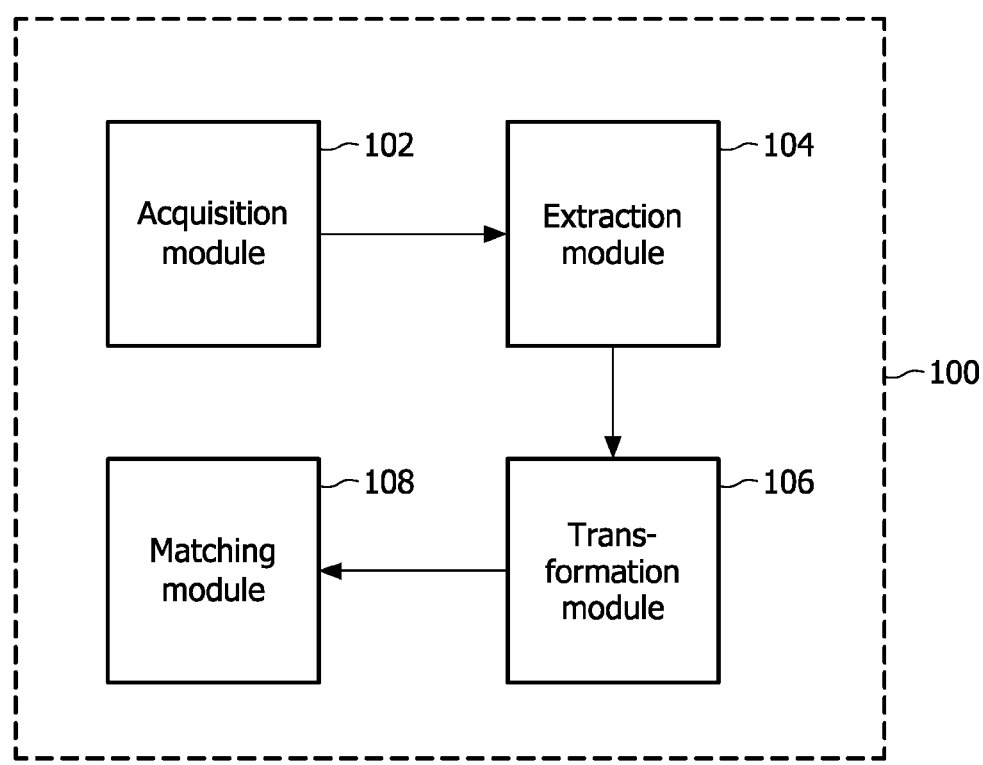
FIG. 1 is a block diagram illustrating a biometric system according to an embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a block diagram of a biometric system 100 according to an embodiment of the present invention. The system 100 comprises a biometric acquisition module 102 for providing biometric information representative of an individual, a feature extraction module 104 arranged to generate at least one feature vectors based on the biometric information, a transformation module 106 for transforming the at least one feature vectors into at least one feature code, and a matching module 108 for providing a matching score based on a comparison of the at least one feature code and at least one pre-recorded feature code representative of a plurality of individuals. The system 100 in the illustrated embodiment is adapted to receive generic face related biometric information, and as such, it is possible to use different kind of, or a combination of face, voice, iris, fingerprint, and/or similar biometric information. Furthermore, the system 100 is in the illustrated embodiment an identification system, even though the system 100 easily can be reorganized to an authentication system.

The difference between an authentication and an identification system lies in the actual comparison of pre-recorded biometric information and at the time of execution collected biometric information of an individual. In authentication, an individual claims to have a certain identity, and the authentication system compares an offered biometric template with a biometric template stored somewhere in the system that is linked to the claimed identity. In comparison, in the case of identification, the offered biometric template is compared with all available templates in order to reveal the identity of an individual. In the illustrated system 100, the biometric acquisition module 102, for example in the form of an image sensor (for example a CCD or a CMOS image sensor), acquire a digital image representative of the individual that wants to be identified.

In turn, the feature extraction module 104 receives the digital image and performs one of various possible feature extraction methods known in the art. In the present case, based on a digital image, a plurality of feature vectors are extracted, similarly to the case where a digital representation of an individual's voice is used for identification/authentication. However, in other cases, for example in relation to biometric data based on finger print recognition, it might be possible that only a single feature vector is extracted. In any case, the general concept of the invention is applicable to a single or a plurality of extracted feature vectors.

As mentioned above, the extracted feature vector is generally a high dimensional vector composed of a plurality of feature each represented by a large, possibly floating point, value. By using an arrangement according to the present invention comprised in a transformation module 106, it is possible to transform the at least one feature vectors into at least one feature code. Further discussions relating to the transformation module 106 is provided below.

The matching module 108 in turn looks at the extracted at least one feature code, and compare the at least one feature code with at least one pre-recorded feature code representative of a plurality of individuals stored in a database, and generates a matching score. There is a plurality of different matching methods available in the art, including determination of a Euclidian distance, matching using a similarity measure or a dissimilarity measure (e.g. a higher Hamming distance means more dissimilar). In any case, the matching score is compared with a predetermined threshold, and if the matching score crosses the threshold (lower or higher depends on if a similarity measure or a dissimilarity measure is used) the individual is identified. If however the matching score does not cross the threshold, the individual is tagged as an imposter (for example due to the fact that the individual is not prerecorded in the database).

The transformation module 106 according to the present invention is preferably adapted in accordance with the below discussion of the method according to the present invention, wherein a real-valued feature vectors having D features is transformed into feature codes of a predetermined size B, while optimizing the classification performance, using an encoder. From a descriptive point of view, it is initially assumed that for every of the D features there is an encoder for generating $b_i$ bits where $i=1, \ldots, D$ and $b_i \in \{0, \ldots, b_{max}\}$.

Thus, for every feature index i with corresponding encoder setting $b_i$, the performance measure for this encoder is given as $q_i(b_i)$, $i=1, \ldots, D$, and it is further assumed that the overall classification performance can be written as $$\sum_i q_i(b_i).$$

The problem of finding an optimal bit allocation, in the sense of optimizing q, under the constraint of generating a binary string of length B is thus equivalent to finding $b_i^*$, $i=1, \ldots, D$, which maximize $$q = \sum_i q_i(b_i)$$

under the constraint that $$\sum_{i=1}^{D} b_i^* = B.$$

According to prior art, and as well known by the skilled addressee, the equivalent problem of minimizing encoder distortion given an upper bound to the bit rate is solved by first rewriting it as an unconstrained Lagrange minimization problem. The present invention makes use of this in the context of transforming biometric feature vectors into binary strings, and thus, according to the present invention, the equivalent problem is solved using the unconstrained Lagrange maximization problem:

$$\{b_i^*\}_{i=1}^{D}, \lambda^* = \arg\max_{\{b_i\}_{i=1}^{D}, \lambda \geq 0} \left( \sum_{i=1}^{D} q_i(b_i) + \lambda \sum_{i=1}^{D} b_i \right) \quad \text{[Equation 1]}$$

For the problem at hand, the solution can be modified to the following algorithm:

1. Initialize $b_i^0 = 0$, $i = 1, \ldots, D$ such that $B^0 = 0$, where the superscript denotes the iteration count. The iteration counter is initialized as $j = 0$.
2. Compute the performance gain for each component as $$\Delta_i = \begin{cases} q_i(1), i = 1, \cdots, D \text{ if } j = 0 \\ q_i(b_i^j + 1) - q_i(b_i^j), i = 1, \cdots, D \text{ if } j \neq 0. \end{cases}$$

3. Compute which component has maximum performance gain per bit as $$i_{max} = \arg \max_{\{i | b_i < b_{max}\}_{i=1}^D} \Delta_i$$

4. Assign an extra bit to this component/feature and none to the others:

$$b_i^{j+1} = \begin{cases} b_i^j + 1 \text{ if } i = i_{max} \\ b_i^j \text{ if } i \neq i_{max}. \end{cases}$$

5. Compute the number of bits assigned as $B^{j+1} = B^j + 1$.
6. If $B^{j+1} = B$ then take $b_i^* = b_i^{j+1}$, $i = 1, \ldots, D$ else $j = j + 1$ and go to step 2.

As a performance measure $q_i(b_i)$ it is possible to, for example, choose the logarithm of the so-called detection rate $1-\text{FRR}(b_i)$, where $\text{FRR}(b_i)$ is the false-reject rate for feature $i$ when the encoder for this feature uses $b_i$ bits. In this case, assuming that all features are made independent, it is possible to solve this as $$\log(1 - FRR_{tot}) = \sum_i \log(1 - FRR(b_i))$$

Clearly, and as understood by the skilled addressee, other optimization criteria are possible.

Figure 2A:
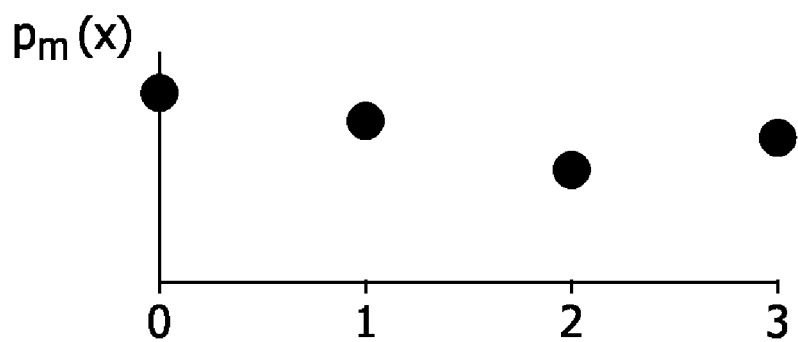
FIG. 2a-c illustrate the combination and optimization of two functions in accordance with a method step according to an embodiment of the present invention.
Figure 2B:
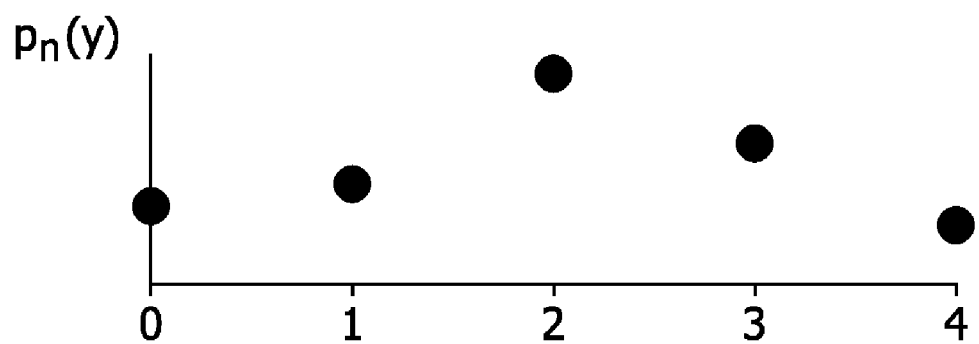
Figure 2C:
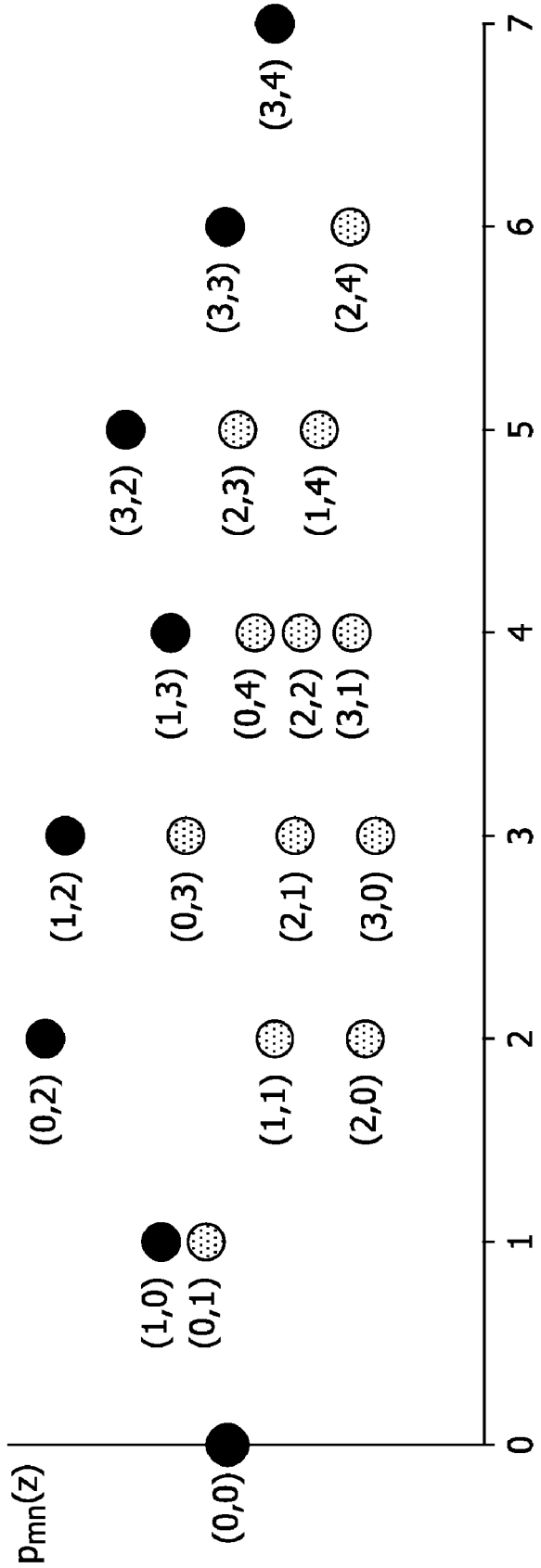

Although the method given above in most of the cases leads to the global optimum, for some functions $q_i(b)$, $i=1, \ldots, D$, this is not the case. Therefore the below discussion relates to an alternative optimization algorithm which is also efficient but always finds the global optimum. As stated above, it is assumed that there is provided D features, and with every feature a function $q_i(b)$, $i=1, \ldots, D$ is associated. For ease of explanation it is further assumed that the domain for every function $q_i(b)$ is equal to $d_i \in \{0, \ldots, b_{max}\}$, but this is not a fundamental restriction as the domain for every function $q_i(b)$ can be different. With B the total number of bits to be assigned, the steps in the optimization algorithm are as follows:

1. (Initializations) Define the set of functions $Q^{(0)}$ to be $Q^{(0)} = \{q_1(b), \ldots, q_D(b)\}$ with corresponding domains $D^{(0)} = \{d_1, \ldots, d_D\}$ where $d_i \in \{0, \ldots, b_{i,max}\}$ and $b_{i,max} = b_{max}$, $i = 1, \ldots, D$
2. From $Q^{(j)}$ choose two functions $q_m(b)$ and $q_n(b)$
3. Define $b_{mn,max} = b_{m,max} + b_{n,max}$ and $d_{mn} \in \{0, \ldots, b_{mn,max}\}$
4. For all $z \in d_{mn}$, define $q_{mn}(z)$ as $q_{mn}(z) = \max_{x,y|x+y=z} (q_m(x) + q_n(y))$ where $x \in d_m$ and $y \in d_n$
5. $Q^{(j+1)} = \{Q^{(j)} - \{q_m(b), q_n(b)\}\} \cup q_{mn}(b)$ with corresponding domains $D^{(j+1)} = \{D^{(j)} - \{d_m, d_n\}\} \cup d_{mn}$
6. If $j + 1 \neq D - 1$ $j := j+1$ and goto step 2
7. Else STOP When exiting these steps, $Q^{(D-1)}$ contains a single function $q(b)$ on the domain $\{0, \ldots, Db_{max}\}$. By evaluating this remaining function in the point $b=B$ the optimal value for $$q = \sum_i q_i(b_i)$$

using B bits is obtained. FIGS. 2a-2c is an illustration of step 4. In FIG. 2c, all possible (x,y) combinations are depicted and ordered such that per column x+y is constant. For example, a pair (3,1) denotes that x=3 and y=1 and appears in the columns z=4. The maximization step chooses the highest value in a column (black dot) while the other values in a column are discarded (grey dots). The black dots together constitute the function $q_{mn}(z)$. When keeping track of the (x,y) pairs for the black dots in the optimization process, the optimal distribution of bits over the different features is obtained as well.

As mentioned above, encoders are required to generate a certain number of bits for a feature. In this section an optimal encoder will be described that can be used in conjunction with the optimal bit allocation algorithm described above.

It is known from classification theory that optimal classifiers can be constructed based on the likelihood ratio l(x) of two probability density functions (PDFs) such that:

$$l(x) = \frac{p_1(x)}{p_2(x)} \quad \text{[Equation 2]}$$

Figure 3A:
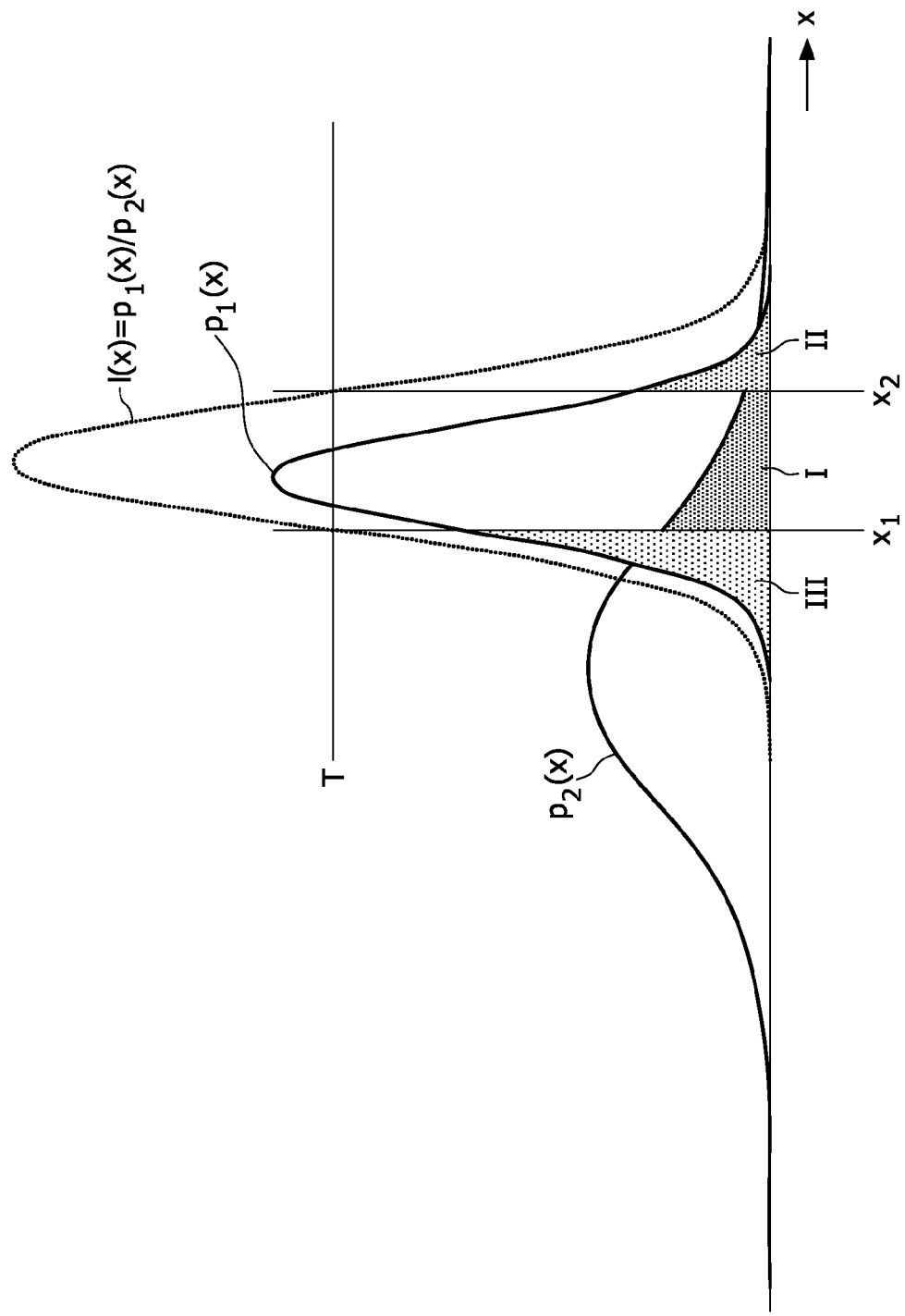

This is depicted in FIG. 3a. In classification theory, $p_1(x)$ corresponds to the genuine distribution while $p_2(x)$ corresponds to the background distribution. An observation X is considered to be drawn from $p_1(x)$ if $l(X) > T$ (or, equivalently, $x_1 < X < x_2$) where T is some threshold. Likewise, if $l(X) \leq T$ the observation X is considered not to be drawn from $p_1(x)$. The area I in FIG. 3a indicates the False-Accept rate (FAR) while the areas II and III together depict the False-Reject Rate (FRR). According to the Neyman-Pearson criterion, a likelihood classifier is optimal in the sense that for a given FAR it leads to the optimal (minimal) FRR. Similarly, given a FRR it leads to the minimal FAR.

In general the functionality of an encoder is to limit the possible values of a quantity (e.g. a feature) to a discrete set of values. According to the present invention, each discrete possible value is represented as one or more bits. In order to encode a feature, its domain is separated in a number of segments. Next, intervals are defined as the union of one or more segments such that all values in a certain interval are mapped onto the same encoder output value. Thus, an optimal encoder can be constructed using a likelihood approach which is in contrast to the methods found in prior art. It should however be noted that it is not necessary to define intervals as the union of one or more segments, this is only optional.

The diagram in FIG. 3a provides an illustration of a first implementation where three segments are defined according to the likelihood ratio of two PDFs: $S_1 = \{x | x_1 < x < x_2\}$, $S_2 = \{x | x > x_2\}$ and $S_3 = \{x | x < x_1\}$. The first interval is defined as $R_0 = S_1$, such that when $X \in R_0$ the encoder produces an output value '0'. Similarly, $R_1 = S_2 \cup S_3$ is defined such that when $X \in R_1$ the encoder produces an output value '1'. This approach results in an encoder generating a single bit which for a given FAR having a minimum FRR (or vice versa).

In many cases it is possible, and also required, for an encoder to generate more than a single bit per feature. This is, for example, the case if the variance of $p_1(x)$ is small as compared to the variance of $p_2(x)$, such that the feature has an information content which is larger than one bit. Moreover, in some applications, such as when the generated bits are to be used in template protection systems, it is required that the individual bits generated by an encoder are statistically independent. Therefore, according to a preferred embodiment of the present invention, for an n bit encoder this is possible by choosing $2^n$ intervals each of which contains $2^{-n}$ of the probability mass of the background distribution. If every interval is coded by a different n feature code, the probability on every string is equal to $2^{-n}$, such that the bits in the string are statistically independent.

Figure 3B:
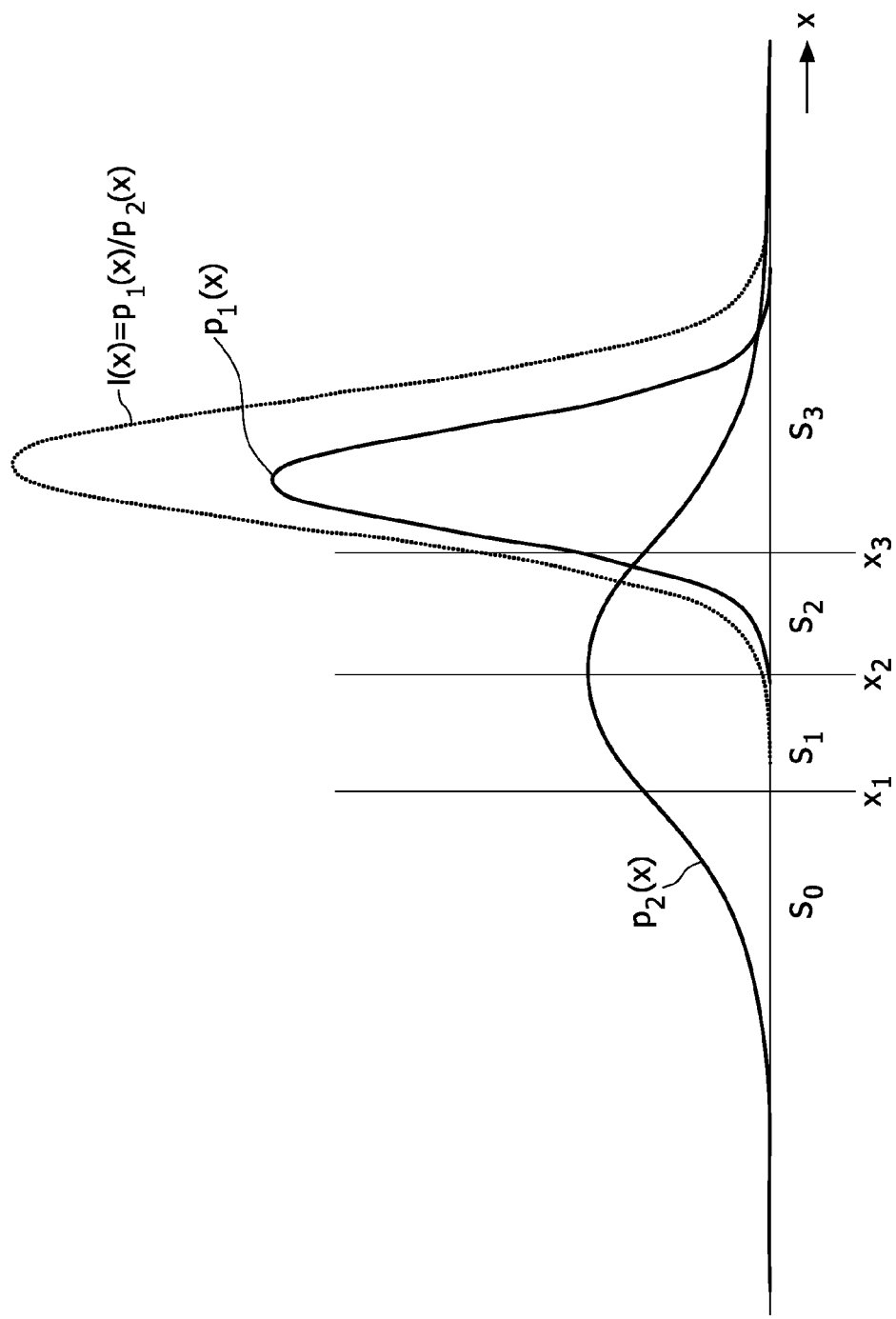

An example of this approach is given in FIG. 3b where a resulting diagram for a two-bit encoder is depicted generating independent bits if it is assumed that every segment $S_i$ corresponds to an interval and every interval contains 0.25 probability mass of the background distribution. This example can be used in practical situations where it is advantageous to fix the intervals, independent from the distribution $p_1(x)$. It is according to the present invention also possible to implement an optimal encoder generating independent bits. In the illustrated embodiment, the encoder generates two bits, but it will be obvious for the skilled addressee that it is possible to generalize the discussion for a different number of bits, such as n number of bits.

The method is illustrated with the help of FIG. 3c where again two PDFs and their likelihood ratio are depicted. As a first step, the likelihood threshold T is chosen such that FAR=0.25 (FAR=$2^{-n}$ in case of an n bit encoder). This means that the probability mass in the segment $S_3=[x_3,x_4]$, indicated by I, equals 0.25. This segment defines the first interval such that $R_0=S_3$. Next, intervals are defined such that every interval contains 0.25 probability mass of the background distribution ($2^{-n}$ in case of an n bit encoder). Also, as discussed above, it is according to the present invention possible (however not necessary) to define intervals as the union of one or more segments.

Figure 3C:
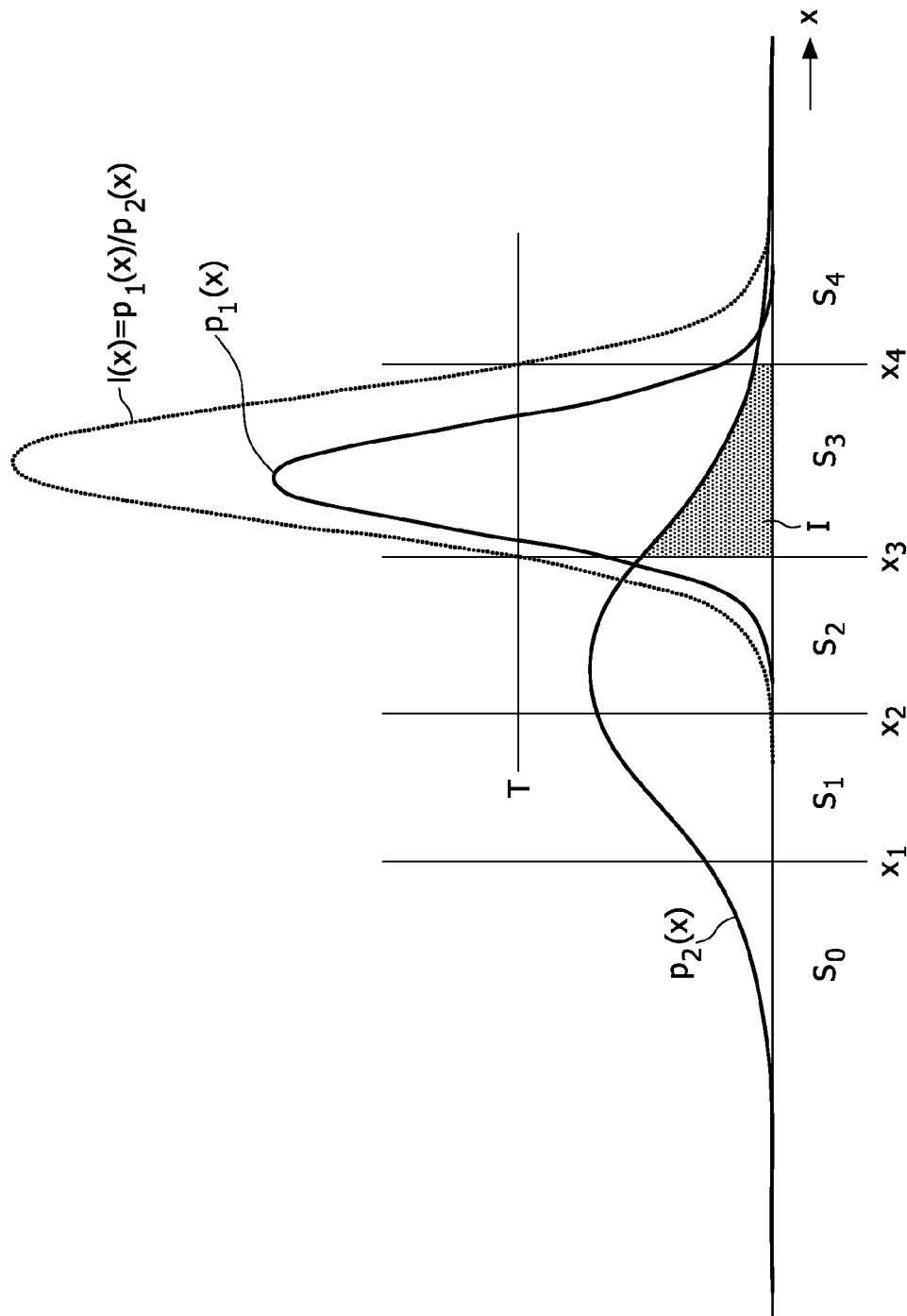

Such an example is given in FIG. 3c, where intervals are defined by assigning segments as $R_1=S_2$, $R_2=S_1$ and $R_3=S_0 \cup S_4$. The four intervals $R_0, \ldots, R_3$ can be encoded by two bits each. If every interval is assigned a different two-bit value, the probability on every pair of bits equals 0.25 this results in independent bits. (Similarly, in case of n bits, n independent bits are generated). Clearly, for a single feature it is possible to choose different encoders that output a different number of bits which results in a different detection rate (1−FRR) for this feature as discussed above in relation to the optimal encoder generating independent bits.

The skilled addressee realizes that the present invention by no means is limited to the preferred embodiments described above. On the contrary, many modifications and variations are possible within the scope of the appended claims. For example, the method explained above assumes that the probability distributions are known and the dependency of the quality of an encoder (e.g. detection rate) as a function of the number of bits can be determined. In case the distributions are not known or are known only with insufficient accuracy an alternative, empirical method can be used, assuming that there are sufficient measurements for a feature.

For this reason, the range of this feature is separated into so many intervals that the maximum number of bits is used and all the available training measurements are transformed into feature codes according to this encoder. By observing and counting the resulting feature codes, it is possible to for example determine the detection rate. An example is given in FIG. 3d where the maximum number of bits equals two, including 15 training measurements having intervals coded using a Gray code. It is clear from FIG. 3d that if two bits, '11', are generated for this feature, the detection rate is estimated as 7/15. On the other hand, if only the rightmost bit is extracted, the estimated detection rate increases to 12/15. In this way, without assuming any specific shape for the probability distribution but by simply counting, it is possible to estimate the detection rate as a function of the number of extracted bits.

The invention claimed is:

1. A method for transforming a feature vector comprising a first and a second feature represented by a first and a second feature value, respectively, into a feature code using an encoder, said feature code usable in an algorithm and having a predetermined number of bits, said method comprising the steps of:
   determining for each of the first and the second features the performance as a function of the length of the feature code; and
   using this dependency between the performance and the feature code length for each of the individual features derived in the step of determining to find feature code lengths for the first and the second features in such a way that the sum of the bit length of the first and the second feature codes has a length equaling said predetermined bit length.

2. Method according to claim 1, wherein the individual feature code lengths are obtained by the steps of:
   combining every possible feature code length of the first and the second features to get a number of combined feature code lengths;
   determining, for every combined feature code length, one or more combined performance measures;
   determining, for every combined feature code length, the feature code length combination that gives optimal performance;
   discarding, for every combined feature code length, the feature code length combinations that do not have optimal performance; and
   choosing the combined feature code length that is equal to the predetermined number of bits.

3. Method according to claim 1, wherein the individual feature code lengths are obtained by the steps of:
   a) encoding said first feature value into a first feature code and said second feature value into a second feature code, each feature code being assigned an initial number of bits;
   b) determining an algorithm performance parameter for each of said first and said second feature code;
   c) determining the performance increase for either feature when assigning at least one more bit to the feature code;
   d) re-encoding that one of said first or said second feature value having the largest increase in into an updated first or second feature code;
   e) comparing the sum of bits assigned to the first and second feature code with the predetermined number of bits of the feature code; and
   f) repeating steps b-e until the sum of bits used for the first and second feature code equals the predetermined number of bits of the feature code.

4. Method according to claim 1, wherein said feature vector is a biometric feature vector for an individual usable is an identification or verification system, and wherein the algorithm performance parameter is the detection rate for the identification or verification system.

5. Method according to claim 1, wherein the encoder is determined using the steps of:
   determining an individual probability distribution for each of said first and second feature for an individual;
   determining a population probability distribution for each of said first and second feature for a population;
   determining a likelihood ratio function based on the individual probability distribution and the population probability distribution;
   determining encoding intervals based on said likelihood ratio function.

6. Method according to claim 5, wherein the encoding intervals are defined as the union of at least two separate segments.

7. Method according to claim 5, wherein the encoding intervals are defined such that population probability mass in each of the encoding intervals equals $2^{-n}$, where n equals the number of bits assigned to the encoder.

8. Method according to claim 1, wherein encoding intervals for the encoder are defined such that population probability mass in each of the encoding intervals equals $2^{-n}$, where n equals the number of bits assigned to the encoder.

9. A method for authenticating the identity of an individual based on biometric features, comprising the steps of:
- receiving identity related information inputted by the individual;
- receiving, from a sensor, biometric information representing said individual;
- extracting at least one biometric feature vector from the biometric information;
- transforming said at least one feature vectors into at least one feature code using the method according to claim 1;
- comparing the at least one feature code with at least one pre-recorded feature code associated with the identity related information, thereby generating a matching score; and
- authenticating the individual if the resulting matching ratio crosses a predetermined threshold.

10. A method for identifying an individual based on biometric features, comprising the steps of:
- receiving, from a sensor, biometric information representing said individual;
- extracting at least one biometric feature vector from the biometric information;
- transforming the at least one feature vectors into at least one feature code using the method according to claim 1;
- comparing the at least one feature code with at least one pre-recorded feature code, thereby generating a matching score; and
- identifying the individual as a specific individual if the resulting matching ratio crosses a predetermined threshold.

11. An arrangement for transforming a feature vector comprising a first and a second feature represented by a first and a second feature value, respectively, into a feature code using an encoder, said feature code usable in an algorithm and having a predetermined number of bits, said arrangement comprising:
- means for determining for each of the first and the second features the performance as a function of the length of the feature code; and
- means for using the dependency between the performance and the feature code length for each of the individual features derived using the means of determining to find feature code lengths for the first and the second features in such a way that the sum of the bit length of the first and the second feature codes has a length equaling said predetermined bit length.

12. A biometric system, comprising:
- a biometric acquisition module for providing biometric information representative of an individual;
- a feature extraction module arranged to generate at least one feature vector based on the biometric information;
- an arrangement according to claim 11 for transforming the at least one feature vector into at least one of feature code; and
- a matching module for providing a matching result based on a comparison of the at least one feature code and at least one pre-recorded feature code representative of a plurality of individuals.

* * * * *